Oct. 27, 1964  H. THOMA  3,153,987
PISTON TYPE HYDROSTATIC POWER UNITS
Filed June 29, 1960
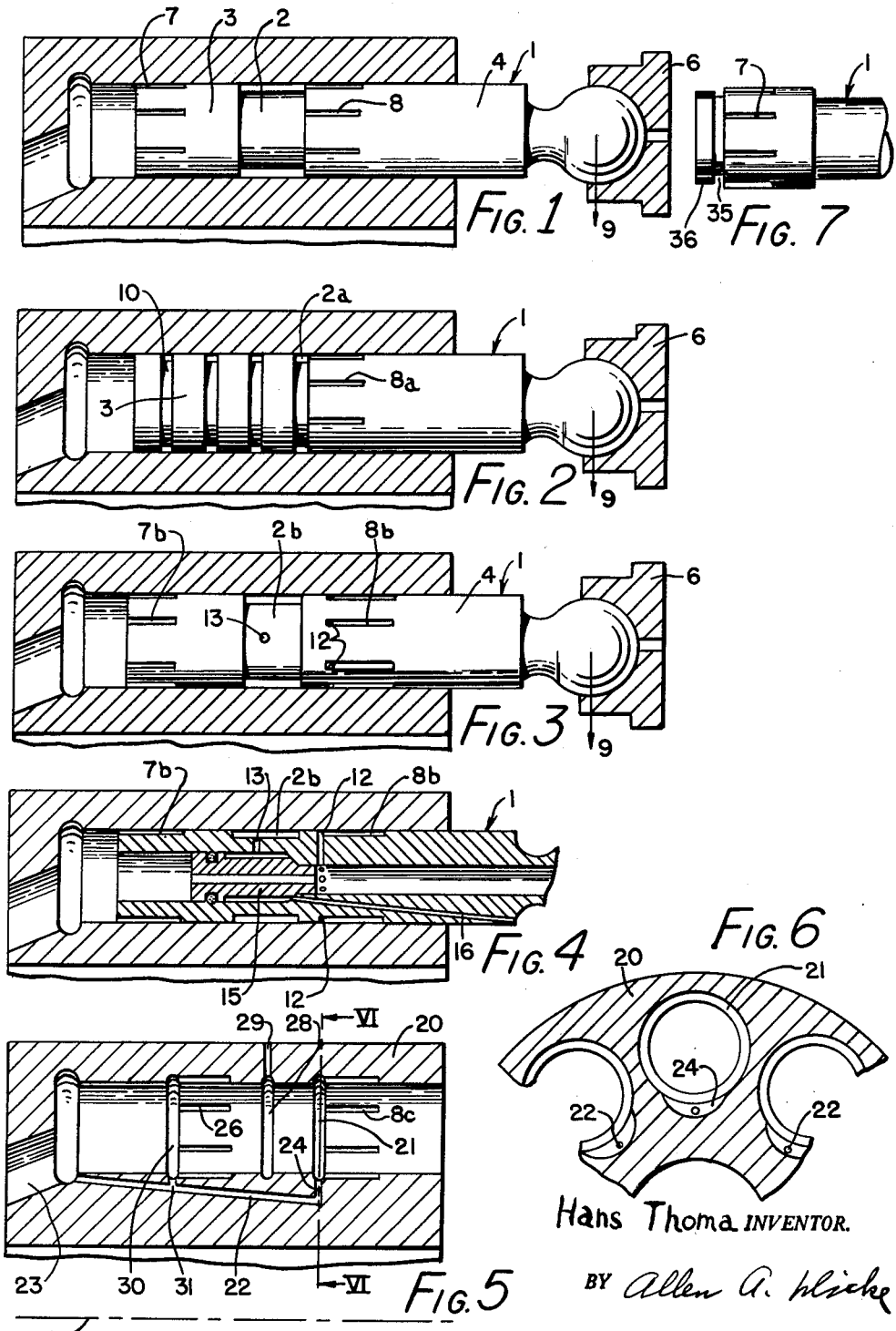
Hans Thoma INVENTOR.
ATTORNEY

United States Patent Office 3,153,987
Patented Oct. 27, 1964

3,153,987
PISTON TYPE HYDROSTATIC POWER UNITS
Hans Thoma, Rotfluhstrasse 10, Zurich, Switzerland
Filed June 29, 1960, Ser. No. 39,689
1 Claim. (Cl. 92—57)

This invention relates to piston type hydrostatic power units and has for an object to provide means to relieve the transverse forces of the piston against the cylinder walls especially in such units in which torque is transmitted by bending moments in the piston, i.e. by forces acting on the piston transversely thereof and near its outer end, outside of the cylinder, as in U.S. Patent 2,093,477.

It is another object to provide pressure oil areas between the piston and the cylinder walls in such units and to control the pressure in such areas in which such transverse forces occur in such a manner that as the piston approaches the cylinder wall, the oil pressure rises at the point in question to compensate for and balance out the forces acting on one side of the piston near the outer end of the cylinder and/or acting on the other side of the piston at its inner end. This is effected by providing throttled pressure oil to the required points. When the piston is pressed close to the cylinder wall at a certain point, the velocity of flow of oil through the throttling action to the clearance space between piston and cylinder is low, the hydraulic pressure losses are small and the pressure in the oil film is high so as to balance out the transverse forces. If the piston moves away from the cylinder wall, the velocity of flow increases, the hydraulic pressure losses through the throttling section increase and the pressure in the oil film drops. This adjustment of oil pressure is entirely automatic.

It is a further object to provide force balancing oil areas to counter-balance forces applied to the piston near the outer end thereof.

Another object is to provide at least two systems of pressure oil areas which are so formed and supplied with pressure oil that they produce different oil pressure forces along each generatrix of the cylinder.

Another object is to provide two such pressure oil areas separated by an annular groove in the piston or cylinder wall and to provide separate means for evolving pressure areas in such a manner that the piston is able to take lateral loads applied near one of its ends.

Further objects and advantages of this invention will be apparent from consideration of the specification as illustrated by the accompanying drawings of possible embodiments of the invention, in which drawings:

FIG. 1 shows one embodiment of the invention as applied to a hydrostatic unit, the piston being shown in elevation and the cylinder in cross-section.

FIG. 2 is a similar view of a modified form.

FIG. 3 is a similar view of a second modified form.

FIG. 4 is a view of the modification shown in FIG. 3, the piston being shown in cross-section.

FIG. 5 shows a further modification in which pressure area development grooves are formed in the cylinder wall.

FIG. 6 is a partial cross-sectional view taken on the line VI—VI of FIG. 5, the piston being omitted.

FIG. 7 is a fragmentary view illustrating in elevation the inner end of a piston similar to the pistons shown in FIGS. 1, 3 and 4 but modified in such a way that the oil supply for the grooves is taken from the oil film between the outer piston surface and the cylinder wall.

Referring to FIG. 1 the piston 1 has a running or sealing surface divided by a recess or annular groove 2 into two different parts 3 and 4. The manner in which the piston is mechanically connected to the propulsion unit parts of the transmission is not essential to the invention. The outer end of the piston is ball-shaped and in a known mannner transmits the piston forces through a slide shoe 6 to a frequently fixed reaction member, such as a swash plate. Under these conditions, intensive lateral pressure effects arise which subject the piston to a bending moment and the piston contact surface to considerable load, especially at the outer end of the cylinder. To enable such forces to be absorbed, a system of pressure oil areas is provided in each part 3 and 4 of the piston surface. This is effected, for example, by disposing throttle grooves 7, say four or six on the piston surface, starting from the left-hand side. These grooves ensure that when the left-hand piston part 3 moves eccentrically in the cylinder slide-way, oil pressure areas form at the surface of the left-hand part of the piston and ensure that centering forces are exerted on the piston. This system may be used for pistons subjected to a considerable eccentric load. Thus, it is useful with pistons loaded with the force 9 or, in other words, for pistons exposed to an additional or solely a torque load. If individually controlled pressure oil areas are provided at the piston ends the condition of parallelism is satisfied to a certain degree if the end parts are not excessively long. This is true even in instances when the pistons are subjected to an eccentric and the like load so that such torsional loads can be taken therewith, with the pressure oil areas being controlled individually at each end. This is possible especially if the recess 2 in the present FIG. 1 is not made too narrow.

The recess 2, further ensures that the development of oil pressure around the piston becomes uniform. Consequently, it is possible, starting from this recess 2, to provide a further system of throttle grooves 8 in the surface of piston part 4. This system of four or six different grooves will ensure that pressure oil areas also form at this region and exert a centering action on the piston. The fact that the said arrangement of the recess 2 and the application of two throttle systems enables two separate pressure oil areas to form on the surface of the piston parts enables even intensive lateral forces on the piston, for example a transverse force 9, to be balanced immediately. Rapid balancing is obviously impossible in the known arrangement of a single pressure oil area system along the piston. The recess or annular groove 2 in the piston surface is essential to the mode of operation of the invention, and ensures that leakage oil seeping through from the left-hand side of the piston is uniformally available on the entire periphery of the right-hand piston side 8, so that the desired pressure oil areas can form on this side independently of the pressure distribution in the left-hand side of the piston. It is obviously not so important for the left-hand piston side to have the throttle groove systems 7, because relatively low surface pressures occur at this region, particularly if purely transverse forces 9 have to be absorbed at the outer end of the piston and not actual torques.

In this case it would be possible to simply give the piston only the clearance necessary to allow leakage oil to seep sufficiently through the left-hand side of the piston 9, so that the oil pressure evolution acts satisfactorily the right-hand piston end at 4. Alternatively, throttle grooves 7 are taken through the left-hand track, so that there is an abundant flow of seepage oil available to relieve the right-hand side of the piston of load. Finally, it is also possible to simply provide the left-hand piston end with a number of annular grooves in known manner and hence ensure at least uniform distribution of the oil pressure over the periphrey of the left-hand end of the piston. This groove arrangement is sufficient in some cases, if the transverse forces 9 are not too considerable, because at this point, depending on the length conditions, the surface load is as a rule barely half of what has to be absorbed at the right-hand piston end. A piston of this kind would, for example, have the form shown in FIG. 2. It would also be equipped with an annular recess 2a, which may also be quite narrow. Small dimensions for this groove will suffice to supply sufficient uniform quantities of leakage oil for seepage through throttle grooves 8a on the surface of the piston. Further annular grooves 10 may be disposed on the left-hand side of the piston. Since this arrangement is frequently customary it may be assumed, that if the load is not excessive it is sufficient to take the forces which in this case are not very high. This is true because the loads on the left-hand side of the piston, especially for outward transverse forces 9, are low as compared with the loads on the right-hand side of the piston.

In the arrangement of the kind described in FIGS. 1 and 2, the quantities of oil available for the left-hand and right-hand piston sides are disposed successively as it were in their flow. Consequently, for each piston half there is available only half the operating pressure as a differential pressure for feeding the oil pressure area and for the development of the forces required here. This is true unless the left-hand half of the piston is subjected to a smaller load and is intentionally provided with larger throttle grooves or with grooves which are disposed fairly close to the annular groove 2a or a fairly large piston clearance is provided or the left-hand part of the piston is made short in comparison with the right-hand part. In the case of transmission pistons subject to high lateral pressure, and this is very probably the case with the assumption made in FIGS. 1 and 2 relating to the torque transmission by means of the forces acting on the outer end of the piston, the load absorbing capacity, especially of the outer pressure oil areas, can be greatly increased if an appropriate supply of fresh, high-pressure oil ensured. FIGS. 3 and 4 show such an embodiment of the invention, in which the piston 1 is again assumed to be loaded by the transverse force 9 at its outer end. The piston has a recess 2b in the center, which may also be a relatively short annular groove. In the first instance it is less important to the invention how the left-hand side of the piston is equipped, and by way of example it is possible here to provide throttle grooves 7b similar to the grooves 7 shown in FIGS. 1 and 7. The grooves 7b ensure a suitable oil pressure area development in the left-hand side of the piston. Throttle grooves 8b are also provided at the running and sealing surface 4 of the right-hand piston surface, but they do not lead into the recess 2b. Each of the throttle grooves 8b are connected to a small transverse duct 12 which may be so constructed that it communicates more or less directly with the high-pressure prevailing at the left-hand end face of the piston. A further duct 13, for example, may be provided in the recess 2b, and this duct is placed into communication with the discharge side or atmosphere at the right-hand piston end, through drainage duct 16.

The mode of operation of the piston arrangement shown in FIGS. 3 and 4 is as follows: As soon as the right-hand piston running and sealing surface 4 very closely approaches the cylinder wall at a point, for example at the throttle groove 8b, the full oil pressure develops in this throttle groove, since at the left-hand ends of this throttle groove high pressure is supplied by means of the duct 12 and this high pressure is not, or at least not unduly, throttled due to the low velocity of the flow. On the other hand, the pressure drops at this point as soon as the relevant part of the piston moves away from the cylinder wall due to the relatively high velocity of flow. As a result of the said limitation of this oil pressure area to the right-hand side of the piston, this arrangement in these conditions operates practically exactly or almost exactly as if the piston were to be situated in the cylinder bore in a plane-parallel position. The aforesaid discharge duct at 13 is not absolutely necessary in these circumstances, although it obviously tends to facilitate the control of the left-hand piston end by means of the throttle grooves 7b and, possibly, also favorable influences the oil pressure evolution at the right-hand piston end.

FIG. 4 shows the various possibilities of supplying pressure oil to the ducts 12, and, if desired, the discharge of the leakage oil through the discharge duct 13 when a lower pressure is required at that point. The performance of this task is facilitated by the fact that the pistons as a rule have a central bore for the purpose of supplying pressure oil to the slide shoe 6. If it is required to only supply high-pressure oil to the ducts 12, it is sufficient to form the said ducts to a depth such as to enable them to be connected to the pressure oil chamber of the relevant part of the transmission. The discharge duct 13 can in these circumstances be placed in communication with the exterior, by inserting a bushing 15 in the interior of the piston. As shown in the drawing, this bushing enables oil to emerge in the pressureless state into the transmission casing through the drainage duct 16, which extends at an angle in the piston.

If the recess 2b on the piston surface is made longer than the maximum piston stroke, then the cylinder body at the point in question may naturally be formed with a discharge duct in order to eliminate any undesired oil pressure at that point. If a recess of a certain length is also formed in the cylinder wall at this point, then it is possible in some cases to obtain an even more favorable formation of the oil pressure areas.

It was hitherto assumed that the oil pressure areas and the associated grooves and recesses, especially the throttle grooves, were disposed in the surface of the piston. It is, however, possible to provide the necessary grooves, or speaking quite generally, the necessary recesses, in the surface of the cylinder wall. FIGS. 5 and 6 show an arrangement of this kind, wherein all the grooves and recesses are provided in the cylinder wall of a rotating cylinder block 20. This is shown formed with an annular groove 21, which communicates through the duct 22 with the cylinder port 23 of the cylinder in question, in which practically the same high pressure prevail behind the piston. In these circumstances the annular groove 21 may be made to communicate with the duct 22 in various ways, for example by means of a transverse connecting duct 24 as shown in FIGS. 5 and 6.

Throttle grooves which allow the formation of the required pressure oil areas in known manner may also be provided in the cylinder track surface for the left-hand side of the piston track, see for example grooves 26 in FIG. 5. In some cases, however, it is obvious that these grooves should be left on the piston surface since it is somewhat more difficult to provide the grooves in depth in the interior of the cylinder, and the load on these surfaces is also less than at the open cylinder end. This is usually the case, when it is necessary to take the transverse forces originating from torque transmitted at the outer end of the piston. An annular groove 28 which serves for the discharge of the seepage oil can, in these circumstances, be made to communicate with the transmission casing through the bore 29 and can thus be substantially freed from pressure, unless it is preferred to provide such a discharge means for seepage oil on the piston surface by the measures described hereinbefore, or when it is not desired to dispense with this feature.

In the description thus far it has been assumed that the pressure oil area production was effected by simple throttle grooves of appropriate length, which as a rule do not completely pass through the part of the running surface in question. Instead of this, it is also possible, in known manner, to shorten the throttle grooves and bring the same into communication with an enlarged groove space or with a recess, so that the spread of the oil pressure is facilitated. The provision of the oil pressure areas may therefore be made in known or self-suggesting manner somewhat differently from that shown in the drawings without this being essential to the invention.

What is important to the invention is the provision of an oil pressure area at the outer end of the piston, in which the oil pressure depends exactly on the distance of the piston from the cylinder wall at the outer end of the cylinder track. On the contrary, in the known arrangement the oil pressure, is at least substantially determined by the distance of the piston wall from the cylinder surface at the inner end of the piston. It is only with the arrangement of the invention that is possible to absorb forces which act on the piston at a great distance outside the center section of the piston and the resultant of which is situated outside the piston track. Further, these forces will be absorbed by the pressure oil areas in such manner as to avoid metallic friction or undue wear, particularly at high operating pressures and in the presence of considerable lateral forces.

The provision of oil pressure areas by means of grooves or recesses provided on the cylinder wall and not on the piston has in these circumstances particular advantages in the case of transmissions of the kind in which a considerable lateral pressure at the outer piston end has to be transmitted. Thus it is advantageous to maintain an abundantly high pressure oil area at the actual outer end of the cylinder track as far as possible. In this case, if the throttle grooves and the pressure oil areas are produced by means on the cylinder track, it is possible to achieve the effect that even in the innermost piston position each pressure oil area extends to the region of the outer cylinder end. It should be obvious that this is important for pistons which are subjected to heavy lateral pressure, that is to say pistons of the kind which transmit the effective torque. In the form of construction shown in FIGS. 5 and 6, the piston itself may be made with a smooth outer surface, viz. without grooves or recesses.

It is now possible to feed the pressure oil area which is to relieve the inner piston end of the load of the transverse forces through an annular groove 30 which is fed with high pressure oil, for example at 31. This supply or feed being effected, through the duct 22 which is in any case required for the outer annular groove 21. This system results in a cylinder track part which is limited by this annular groove 31 and which may be so selected that it is never completely passed by the left-hand piston end. This system may be very advantageous in cases involving dirty oil, as in that case the entry of foreign bodies through the inner end of the piston is obviously rendered difficult. The entry of foreign bodies into the duct 22 is improbable inasmuch as the same is situated fairly near the axis of rotation 33 of the cylinder block so that foreign bodies which enter through the cylinder ports 23 are driven outward by centrifugal forces and are prevented from entering the duct 22 by said centrifugal forces. The action of this centrifugal force separation of foreign bodies may in these circumstances by further assisted by forming the duct 22, as shown in the drawing, at an angle somewhat to the axis of rotation 33, so that foreign bodies which may accidentally enter, for example through turbulence, are removed from said duct 22 by the centrifugal force. This assumes that there is no excessively fast flow in the duct 22, and this effect can also be achieved with appropriately small throttle grooves.

A similar state of affairs can be achieved with the construction shown in FIG. 1, if the left-hand piston end is made as shown in FIG. 7. In this form the annular groove 35 is disposed in front of the throttle grooves 7 and there is disposed in front of the said annular groove 35 the short part 36 of the "running" piston surface. This part 36 is not grooves but is, perhaps, made somewhat smaller in diameter than the rest of the piston surface. In this way, it is obviously possible to prevent the entry of fairly large foreign bodies into the throttle groove system. The same effect can also be achieved with the construction shown in FIG. 3 for the right-hand groove system, using suitable connecting ducts which are not explained in detail here, particularly since it is possible, by appropriate choice of the diameter at 36, to make available sufficient pressure oil in the annular groove 35 for two groove systems as well.

The invention is not intended to be limited to the several illustrative forms shown and described which are to be understood as illustrative only and not as limiting, as various changes in construction and arrangement may be made including combining features of the said forms, all coming within the scope of the claim which follows:

I claim:

In an hydrostatic power unit of the type having a pump or motor piston reciprocating in a cylinder with its outer end always projecting from said cylinder and a force transmitting member acting transversely on the said outer end of said piston and which therefore produces transverse forces between the piston and cylinder near the outer end of the cylinder and transverse forces between the cylinder and the other side of the piston near its inner end, the improvement which comprises means for hydraulically balancing said transverse forces between the piston and the cylinder, said means comprising a plurality of fine throttling grooves formed on the outer surface of said piston near the inner end thereof where the innermost ends of said grooves are subjected to the oil pressure in the cylinder space at the inner end of the piston, whereby a balancing pressure area is formed on that side of the piston near the inner end where it is pressed closest to the cylinder wall, together with another plurality of fine throttling grooves formed on the outer surface of said piston toward the outer end thereof, an annular groove in the piston between the two sets of fine throttling grooves with which the inner ends of the second mentioned throttling grooves communicate, whereby oil flowing past the inner end of said piston and through said first mentioned throttling grooves flows into said annular groove and thence into the second plurality of fine throttling grooves and forms a balancing pressure on that side of the piston near the outer end of the cylinder where it is pressed closest to the cylinder wall.

References Cited in the file of this patent

UNITED STATES PATENTS

| | | |
|---|---|---|
| 1,274,391 | Davis | Aug. 6, 1918 |
| 1,480,481 | Wakefield | Jan. 8, 1924 |
| 1,487,965 | Michell | Mar. 25, 1924 |
| 1,883,637 | Edwards | Oct. 18, 1932 |
| 2,155,455 | Thoma | Apr. 25, 1939 |
| 2,166,857 | Bugatti | July 18, 1939 |
| 2,300,009 | Rose | Oct. 27, 1942 |
| 2,337,821 | Huber | Dec. 28, 1943 |
| 2,430,764 | Gabriel | Nov. 11, 1947 |
| 2,449,297 | Hoffer | Sept. 14, 1948 |
| 2,709,339 | Edelman et al. | May 31, 1955 |
| 2,821,145 | Douglas | Jan. 28, 1958 |
| 2,847,938 | Gondek | Aug. 19, 1958 |